US011993930B2

(12) United States Patent
Weaver et al.

(10) Patent No.: US 11,993,930 B2

(45) Date of Patent: May 28, 2024

(54) SEALING LOUVERS FOR ROOF STRUCTURES

(71) Applicant: OmniMax International, LLC, Peachtree Corners, GA (US)

(72) Inventors: David G. Weaver, Southlake, TX (US); Vincent J. Kehs, Barto, PA (US); Benjamin R. Elliott, Chattanooga, TN (US)

(73) Assignee: ALUMAWOOD OUTDOOR LIVING LLC, Holbrook, NY (US)

( * ) Notice: Subject to any disclaimer, the term of this patent is extended or adjusted under 35 U.S.C. 154(b) by 0 days.

(21) Appl. No.: 16/908,938

(22) Filed: Jun. 23, 2020

(65) Prior Publication Data

US 2020/0318348 A1 Oct. 8, 2020

Related U.S. Application Data

(63) Continuation of application No. 15/484,921, filed on Apr. 11, 2017, now Pat. No. 10,724,236, which is a (Continued)

(51) Int. Cl.

*E04B 7/16* (2006.01)

*E04D 13/064* (2006.01)

(Continued)

(52) U.S. Cl.

CPC ............ *E04B 7/163* (2013.01); *E04D 13/064* (2013.01); *E04F 10/10* (2013.01); *E06B 7/086* (2013.01);

(Continued)

(58) Field of Classification Search

CPC .......... E04B 7/163; E04D 13/064; F24F 7/02; F24F 13/15; E04F 10/10; E06B 7/086; E06B 7/14

See application file for complete search history.

(56) References Cited

U.S. PATENT DOCUMENTS

| | | | | |
|---|---|---|---|---|
| 147,090 A | | 2/1874 | Baxter | |
| 580,588 A | * | 4/1897 | Waters | F24F 7/02 454/367 |

(Continued)

FOREIGN PATENT DOCUMENTS

| | | |
|---|---|---|
| AU | 3357384 | 1/1985 |
| GB | 2250582 | 6/1992 |

OTHER PUBLICATIONS

U.S. Appl. No. 14/924,970, "Final Office Action", dated Oct. 21, 2016, 17 pages.

(Continued)

*Primary Examiner* — Brian D Mattei

*Assistant Examiner* — Omar F Hijaz

(74) *Attorney, Agent, or Firm* — Bryan Cave Leighton Paisner LLP

(57) ABSTRACT

Louvered roof systems are provided with one or more louvers. Such louvers can be combined in an assembly that is movable between an open condition and a closed condition. In the closed condition, louvers in the assembly engage one another. In such engagement, a leg extending generally transversely from one louver may include a wing that extends generally transversely to the leg and that abuts a surface of an adjacent louver. Additionally or alternatively, in such engagement, a leg extending transversely from one louver may be received in a notch in an adjacent louver. An end cap can include a downwardly extending flange that directs liquid flow from a louver's top surface and past its bottom surface to form droplets or streams to fall from a lower part of the flange and prevent travel of the liquid flow along the bottom surface of the louver.

7 Claims, 5 Drawing Sheets

Related U.S. Application Data continuation of application No. 14/924,970, filed on Oct. 28, 2015, now Pat. No. 9,650,786.

(60) Provisional application No. 62/069,510, filed on Oct. 28, 2014.

(51) Int. Cl.

| | |
|---|---|
| ***E04F 10/10*** | (2006.01) |
| ***E06B 7/086*** | (2006.01) |
| ***E06B 7/14*** | (2006.01) |
| ***F24F 7/02*** | (2006.01) |
| ***F24F 13/15*** | (2006.01) |

(52) U.S. Cl.

CPC ................ *F24F 7/02* (2013.01); *F24F 13/15* (2013.01); *E06B 7/14* (2013.01)

(56) References Cited

U.S. PATENT DOCUMENTS

| | | | | | |
|---|---|---|---|---|---|
| 2,478,061 | A | | 8/1949 | Stearns | |
| 2,817,511 | A | | 12/1957 | Reynaud | |
| 2,860,699 | A | * | 11/1958 | Braun | E06B 9/388 160/173 R |
| 2,910,743 | A | | 11/1959 | Muhn | |
| 2,916,783 | A | * | 12/1959 | Koltvedt | E04F 10/10 49/71 |
| 2,949,042 | A | | 8/1960 | Bennett | |
| 2,981,538 | A | | 4/1961 | Bennett | |
| 2,995,787 | A | | 8/1961 | Guillermo | |
| 3,374,576 | A | | 3/1968 | Duclon et al. | |
| 3,377,745 | A | * | 4/1968 | Seth | E06B 7/084 49/91.1 |
| 3,537,331 | A | | 11/1970 | Rifkin | |
| 3,717,080 | A | | 2/1973 | Foty | |
| 4,038,781 | A | | 8/1977 | Graham et al. | |
| 4,099,346 | A | | 7/1978 | Isono | |
| 4,120,119 | A | * | 10/1978 | Engel | A01G 9/027 47/66.1 |
| 4,190,988 | A | * | 3/1980 | Carreiro | E04D 13/064 52/11 |
| 4,527,355 | A | | 7/1985 | Numakami et al. | |
| 4,655,122 | A | | 4/1987 | Mccabe | |
| 5,048,253 | A | * | 9/1991 | Olsen | F24F 13/15 52/473 |
| 5,054,240 | A | * | 10/1991 | Nakahara | B60J 10/85 49/479.1 |
| 5,159,783 | A | * | 11/1992 | Rossiter | E04B 7/163 49/403 |
| 5,174,467 | A | * | 12/1992 | Sullivan | F24F 13/22 220/571 |
| 5,306,210 | A | | 4/1994 | Smit | |
| 5,501,547 | A | * | 3/1996 | Mantelli | E01C 11/227 404/3 |
| 5,515,902 | A | | 5/1996 | Hoffman | |
| 5,566,738 | A | | 10/1996 | Yadidya et al. | |
| 5,732,507 | A | * | 3/1998 | Edwards | E04B 7/163 49/74.1 |
| 5,941,021 | A | | 8/1999 | Valls, Jr. et al. | |
| 7,335,096 | B2 | | 2/2008 | Perez et al. | |
| 7,377,074 | B2 | * | 5/2008 | Marocco | E06B 7/086 49/87.1 |
| 8,413,389 | B2 | | 4/2013 | Frigerio | |
| 8,857,106 | B2 | | 10/2014 | Colson | |
| D742,499 | S | * | 11/2015 | Wortman | D23/386 |
| 2004/0148899 | A1 | | 8/2004 | Pertile | |
| 2005/0108951 | A1 | * | 5/2005 | McDonald | E04D 13/064 52/11 |
| 2006/0040607 | A1 | * | 2/2006 | Perez | E06B 7/086 454/358 |
| 2006/0070300 | A1 | * | 4/2006 | Gabriele | E06B 7/086 49/403 |
| 2006/0272214 | A1 | * | 12/2006 | Simonelli | E06B 7/086 49/92.1 |
| 2016/0115688 | A1 | | 4/2016 | Weaver et al. | |
| 2017/0218626 | A1 | | 8/2017 | Weaver et al. | |
| 2017/0328598 | A9 | * | 11/2017 | Wortman | F24D 5/08 |

OTHER PUBLICATIONS

U.S. Appl. No. 14/924,970, "Non-Final Office Action", dated Jun. 16, 2016, 16 pages.

U.S. Appl. No. 14/924,970, "Notice of Allowance", dated Jan. 11, 2017, 7 pages.

U.S. Appl. No. 14/924,970, "Restriction Requirement", dated Feb. 10, 2016, 6 pages.

U.S. Appl. No. 15/484,921, "Final Office Action", dated May 17, 2018, 13 pages.

U.S. Appl. No. 15/484,921, "Final Office Action", dated Apr. 16, 2019, 9 pages.

U.S. Appl. No. 15/484,921, "Non-Final Office Action", dated Jan. 23, 2018, 15 pages.

U.S. Appl. No. 15/484,921, "Non-Final Office Action", dated Dec. 27, 2018, 9 pages.

U.S. Appl. No. 15/484,921, "Notice of Allowance", dated Mar. 18, 2020, 7 pages.

U.S. Appl. No. 15/484,921, "Restriction Requirement", dated Nov. 3, 2017, 6 pages.

* cited by examiner

SEALING LOUVERS FOR ROOF STRUCTURES

CROSS REFERENCE TO RELATED APPLICATION

This application is a continuation of U.S. patent application Ser. No. 15/484,921, entitled "Sealing Louvers for Roof Structures," filed on Apr. 11, 2017, allowed, which is a continuation of U.S. patent application Ser. No. 14/924,970, entitled "Sealing Louvers for Roof Structures" filed Oct. 28, 2015, issued as U.S. Pat. No. 9,650,786 issued on May 16, 2017, which claims the benefit of U.S. Provisional Application No. 62/069,510, filed on Oct. 28, 2014 and entitled "SEALING LOUVERS," which are hereby incorporated by reference in their entirety.

FIELD OF THE INVENTION

This application relates to louvered assemblies, and more particularly (although not necessarily exclusively), to louvers for roof structures for exterior building structures.

BACKGROUND

Louvered roof structures are a popular option for conditioning outdoor spaces. Such roof structures generally include a series of closely-spaced louvers (in some cases alternatively called slats or blades) that can be collectively reoriented to change conditions of a space. For example, a series of louvers oriented together so that each is pointed upward may provide gaps between the louver blades through which sunlight or airflow can pass. When shade is desired, the louvers can be moved so that they are positioned generally perpendicular to the sun or other source of light or weather conditions. Such arrangements may allow for a great deal of versatility in adjusting a roof of a patio or other outdoor shelter to accommodate different weather conditions. However, many louver systems are not water tight when the louvers are closed against one another. This can cause problems, such as putting furniture or guests under a louvered roof structure at risk of getting wet in rainy conditions.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

This patent discloses louvered roofing systems and associated components that are configured to prevent or obstruct a flow of liquid, such as rainwater, from traveling between louvers in a closed condition. Projections from the louvers can be used to seal an interface or juncture between adjacent louvers in a louver assembly. In some cases, a leg extending from an edge of one louver (e.g., a trailing edge) can engage another edge of an adjacent louver (e.g., a leading edge). A wing extending generally transversely from a downward leg on a higher louver can be configured to abut a top surface of a lower louver to reduce or prevent liquid flow past the wing along the top surface of the lower louver.

In some cases, one or both of a pair of adjacent louvers includes a notch for receiving a leg that extends from the opposite louver in the pair. For example, a louver positioned at a lower altitude may include a notch for receiving a downwardly extending leg from another louver positioned at a higher altitude. Additionally or alternatively, an underside of the higher louver can include a notch for receiving an upwardly extending leg from the lower louver. Legs received in such notches may provide structural strength to the juncture of the louvers and/or provide a barrier to reduce or prevent liquid flow past the received legs.

In some cases, a louver blade further includes a flange along a lateral edge that extends downward and provides a surface from which water or other liquid will form into droplets or streams for shedding from the flange. This flange may thus prevent water or other liquid from curling around the lateral edge or traveling along the length of the blade, such as by capillary action. The flange may extend substantially along an entire span, or less than the entire span, of the lateral edge of the blade. In some cases, the flange is provided on an end cap that attaches to a lateral edge of the louver blade.

BRIEF DESCRIPTION OF THE DRAWINGS

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Disclosed herein are roofing structures and associated elements that are configured to provide improved sealing and thus reduce or prevent leaking of water or other liquid in between louvers in a closed condition.

Figure 1:
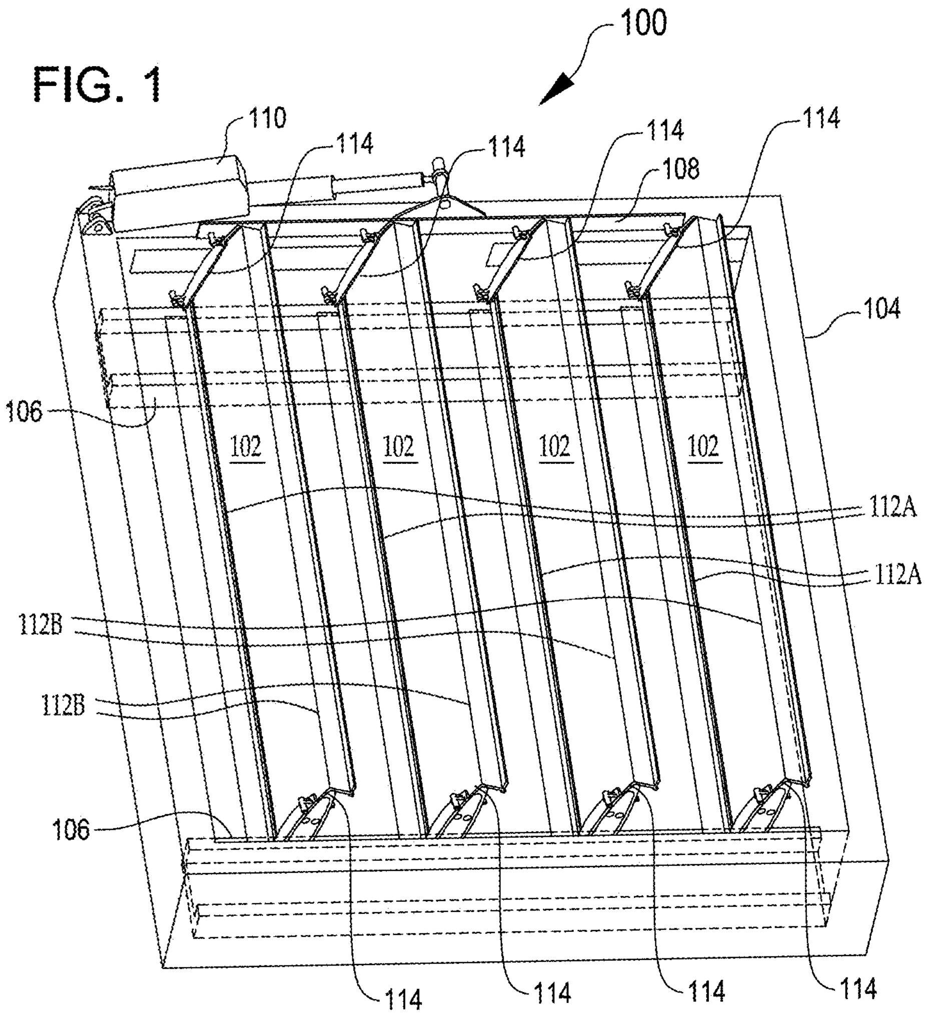
FIG. 1 is a perspective view illustrating an example of a roofing system with sealing louvers in an open condition.

FIG. 1 illustrates a roofing system 100 with louvers 102 in an open condition. The louvers 102 are shown supported within a frame 104. In the open condition shown in FIG. 1, gutters 106 are visible beneath the louvers 102. The louvers 102 are shown attached to a pivot rod 108, which can be moved (for example, by an actuator 110) to shift the louvers 102 between an open condition and a closed condition.

The illustrated louvers 102 include longitudinal edges 112 (e.g., leading edges 112A and trailing edges 112B) and lateral edges 114. The longitudinal edges 112 make up the long edges of the louver 102, running along the length of the louver 102 (e.g., between the lateral edges 114). The lateral edges 114 make up the short ends of the louver 102. In general, when a louver 102 is installed in the frame 104, the longitudinal edges 112 extend substantially parallel to an axis of rotation about which the louver 102 rotates relative to the frame 104. In contrast, the lateral edges 114 generally face the sides of the frame 104, which may extend, for example, between the front and the rear of the frame 104.

Figure 2:
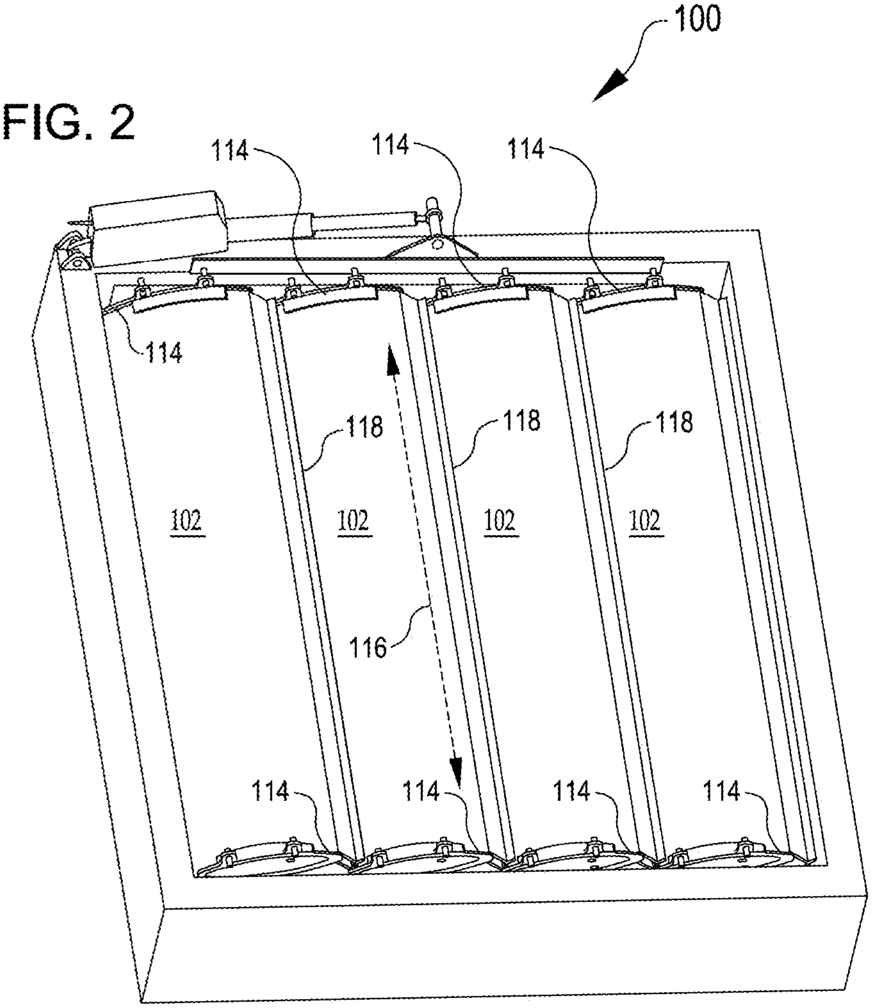
FIG. 2 is a perspective view illustrating the roofing system of FIG. 1 with the sealing louvers in a closed condition.

FIG. 2 illustrates the roofing system 100 of FIG. 1 in a closed condition. In the closed condition, the louvers 102 meet along junctures 118, such as along longitudinal edges 112 of adjacent louvers 102. For example, a particular juncture 118 may represent the engagement or abutment of features along a trailing edge 112B of one louver 102 (such as the leftmost louver 102 of FIG. 1) and features along a leading edge 112A of another louver 102 (such as the louver 102 that is second from the left in FIG. 1). As discussed in more detail below, the louvers 102 can include features that impede, reduce, and/or prevent liquid (such as rainwater) from passing and/or flowing through the junctures 118 (FIG. 2) and/or between the louvers 102 in the closed condition. With the junctures 118 so sealed, water or other liquid may be directed along the longitudinal length of the louvers 102 (such as illustrated by arrow 116 toward lateral edges 114 of the louvers 102. In operation, the rainwater or other liquid directed toward the lateral edges 114 can flow over the lateral edges 114 and down into the gutters 106 (FIG. 1) situated beneath the lateral edges 114 of the louvers 102.

Figure 3:
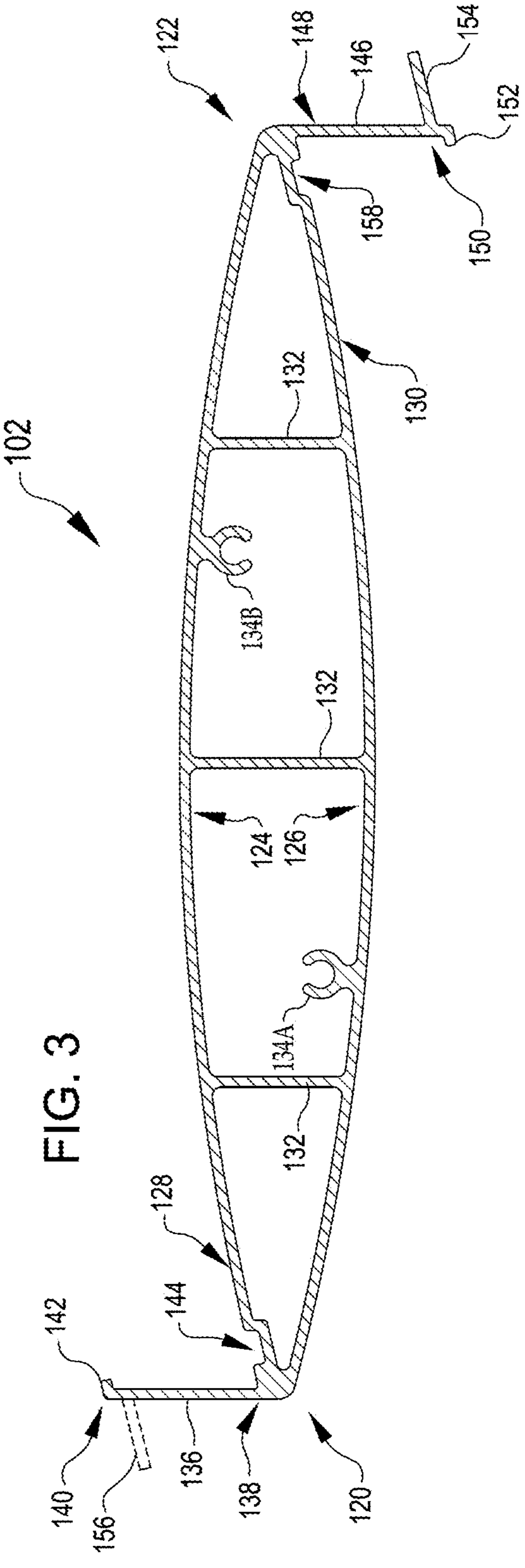
FIG. 3 is an end view of an example of a sealing louver for the system of FIG. 1 and FIG. 2.

FIG. 3 illustrates an end view of an example of a louver 102 of the roofing system 100. By way of example, the louver 102 may be constructed of extruded aluminum, such as (but not limited to) having a wall thickness of approximately 0.085" or approximately 0.065." However, the louver 102 may additionally or alternatively be constructed using any other suitable thickness, material, and/or fabrication process. Features of the louver 102 may be connected with each other in any suitable manner, including being integrally formed together (such as in an injection molding process, a casting process, a three-dimensional printing process, or other process for forming a continuous part), being joined together from multiple pieces (such as through bonding, adhesives, welding, fastening or other joining methods), or combinations of these and/or other processes. Additionally, although the louver 102 shown in FIG. 3 has a cross-sectional shape resembling an airfoil, the louver 102 may have any other suitable shape, such as oval, oblong, round, or another shape, for example, to alter flow characteristics over the louver 102.

In FIG. 3, the louver 102 has a first end 120 and an opposite, second end 122. The first end 120 may correspond to a leading edge 112A of FIG. 1, and the second end 122 may correspond to a trailing edge 112B of FIG. 1. The louver 102 may also include a first side 124 and an opposite, second side 126. For example, the first side 124 may correspond to a top side of the louver 102 when installed, and the second side 126 may correspond to a bottom side of the louver 102 when installed. Furthermore, the louver 102 can include a first surface 128, for example, on the top or first side 124 of the louver 102. The first surface 128 may be positioned and/or extend between outer lateral edges and/or outer longitudinal edges of the louver 102, for example, corresponding to the top surface visible in FIG. 1 between the lateral edges 114 and between the longitudinal edges 112. A second surface 130 (FIG. 3) can similarly be situated on the bottom or second side 126 of the louver 102.

The louver 102 illustrated in FIG. 3 also includes internal structures. For example, ribs 132 between the first side 124 and the second side 126 provide structural reinforcement, such as to maintain the cross-section of the louver 102 in a desired shape. Additionally, fastener mounts 134 (individually 134A and 134B in FIG. 3) are included. Although two fastener mounts 134 are illustrated, any suitable number may be used. The fastener mounts 134 may provide appropriate structure for receiving fasteners, such as for mounting end caps to the louver 102. Further details related to the fastener mounts 134 are described below with respect to FIG. 5.

The louver 102 illustrated in FIG. 3 also includes structures to facilitate sealing. Various such structures will now be described with reference to FIG. 3, and corresponding functions of the structures will be explained in greater detail with reference to FIG. 4 below.

A first leg 136 extends from the first end 120 of the louver 102. The first leg 136 includes a first proximal portion 138 and a first distal portion 140. The first proximal portion 138 may be connected at the first end 120 of the louver 102. The first leg 136 extends from the first proximal portion 138 to the first distal portion 140, such as in a direction that is generally transverse to the louver 102. For example, the first leg 136 is shown extending upward in FIG. 3 from the top or first side 124 of the louver 102. In some cases, the first distal portion 140 the first leg 136 can also include a first bent tab 142, which may be oriented generally transversely to the first leg 136.

A first notch 144 is also shown in FIG. 3 at or near the first end 120 of the louver 102, and on the same side of the louver 102 as the first leg 136 (e.g., on the first surface 128 of the first side 124). The first notch 144 may correspond to a deviation from an otherwise smooth cross-sectional shape of the louver 102. The first notch 144 may be formed as a depression or groove within the first surface 128. For example, FIG. 3 illustrates an arrangement in which the first notch 144 is formed by a jog in a course of a wall that forms the first surface 128 of the top side 124 of the louver 102. Other options are also possible, including, but not limited to, a wall having a different thickness to provide the first notch 144.

A second leg 146 extends from the second end 122 of the louver 102. The second leg 146 includes a second proximal portion 148 and a second distal portion 150. The second proximal portion 148 may be connected at the second end 122 of the louver 102. The second leg 146 extends from the second proximal portion 148 to the second distal portion 150, such as in a direction that is generally transverse to the louver 102. The second leg 146 may be connected to a different side of the louver 102 than the first leg 136 and/or may extend in a direction that is different from the direction in which the first leg 136 extends. For example, the second leg 146 is shown extending downward in FIG. 3 and from the bottom or second side 126 of the louver 102 (e.g., from the second surface 130), whereas the first leg 136 is shown extending upward from the top or first side 124 (e.g., from the first surface 128). Similar to the first leg 136, the second distal portion 150 of the second leg 146 can also include a second bent tab 152, which may be oriented generally transversely to the second leg 146.

The second leg 146 is also shown with a wing 154. The wing 154 extends generally transversely to a longitudinal axis of the second leg 146. For example, the wing 154 is shown in FIG. 3 extending in a rearward direction (e.g., toward the right in FIG. 3), and extending away from the louver 102, including away from the first end 120 and/or the first leg 136. In some cases, another wing 156 may be included on the first leg 136, for example, such that the louver is symmetrical, e.g., having a first wing 156 on the first leg 136 and a second wing 154 on the second leg 146. However, the first wing 156 on the first leg 136 is shown in phantom lines in FIG. 3 to emphasize that symmetry is not a requirement of the louver 102, and that the first wing 156 may be omitted in various arrangements. Although only the first wing 156 is shown in phantom lines in FIG. 3, some combination of features shown in solid lines in FIG. 3 or elsewhere herein may additionally or alternatively be omitted.

A second notch 158 is also shown in FIG. 3 at or near the second end 122 of the louver 102, and on the same side of the louver 102 as the second leg 146 (e.g., on the second or bottom side 130). Like the first notch 144, the second notch 158 may correspond to a deviation from an otherwise smooth cross-sectional shape of the louver 102, such as being formed as a depression or groove within the second surface 130. For example, FIG. 3 illustrates an arrangement in which the second notch 158 is formed by a jog in a course of a wall that forms the second or bottom side 130 of the louver 102. Other options are also possible, including, but not limited to, a wall having a different thickness to provide the second notch 158.

Features of the louver 102 may be sized relative to one another. For example, the first notch 144 may be sized for receiving the second distal portion 150, the second bent tab 152, and/or the wing 154 of the second leg 146 of another one of the louvers 102. As another example, the second notch 158 may be sized for receiving the first distal portion 140, the first bent tab 142, and/or the first wing 156 of the first leg 136 of another one of the louvers 102.

Figure 4:
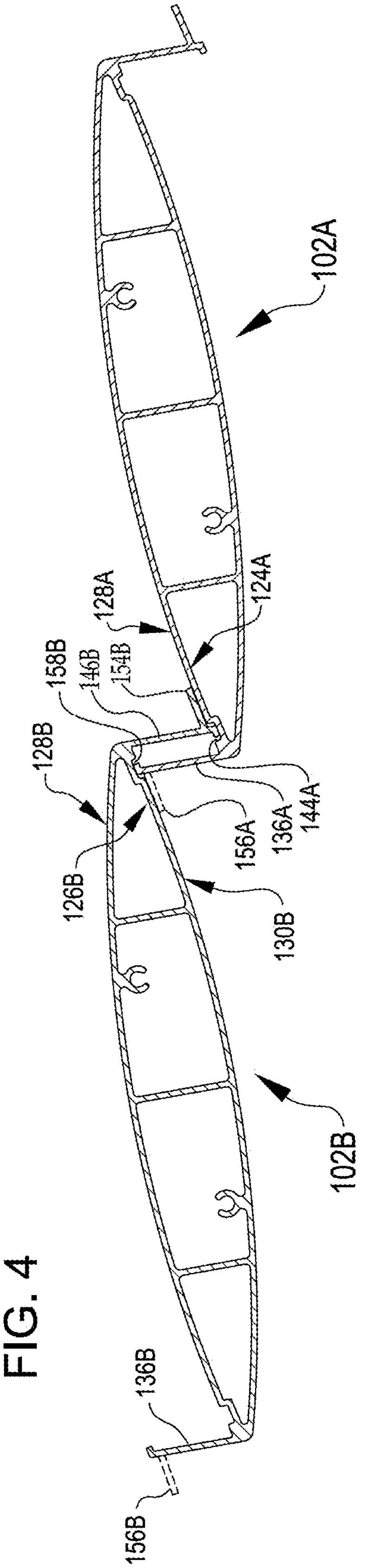
FIG. 4 is an end view of a pair of louvers from FIG. 3, illustrating engagement of the louvers in a closed condition in an assembly according to some examples.

Operation of the louvers 102 is now explained with reference to FIG. 4. FIG. 4 shows a pair of louvers 102 (e.g., a first louver 102A and a second louver 102B) that may be used within the roofing system 100 of FIGS. 1 and 2. The first louver 102A and the second louver 102B are each shown as separate instances of the louver 102 of FIG. 3, with the features previously identified in FIG. 3 now labeled in FIG. 4 with the suffix of A to denote features of the first louver 102A and with the suffix of B to denote features of the second louver 102B.

FIG. 4 illustrates a closed configuration in which the first louver 102A is engaged with the second louver 102B. The second louver 102B is positioned as a leading louver (depicted on the left in FIG. 4), and the first louver 102A is positioned as a trailing louver (depicted on the right in FIG. 4).

In the engagement shown in FIG. 4, the first leg 136A extending from the top side 124A of the first louver 102A is received in the second notch 158B in the second surface 130B on the second or bottom side 126B of the second louver 102B. Additionally, the second leg 146B extending from the second or bottom side 130B of the second louver 102B is received in the first notch 144A in the first surface 128A on the first or top side 124A of the first louver 102A. Furthermore, the wing 154B extending from the second leg 146B of the second louver 102B is shown abutting the top or first surface 128A of the first louver 102A when the louvers 102 are engaged. Similarly, the first wing 156A (if present) extending from the first leg 136A of the first louver 102A can abut the bottom or second surface 130B of the second louver 102B.

The engagement of the louvers 102 shown in FIG. 4 can have a variety of effects. The wing 154B so arranged provides a sealing surface area that prevents water or other liquid falling or otherwise contacting the top or first surfaces 128A, 128B of the louvers 102 from weeping in between the louvers 102. The two engaged legs 136A and 146B can be configured to provide structural strength to the interface between the louvers 102. Additionally or alternatively, the first leg 136A extending upward from the first louver 102A can provide a further barrier against any water or other liquid that may leak past the wing 154B and/or the second leg 146B extending downward from the second louver 102B. As a result of the sealing from the engagement of the first louver 102A with the second louver 102B, water or other liquid falling or otherwise contacting the top or first surfaces 128A, 128B of the louvers 102 in the closed condition may be directed laterally along the louvers 102 (such as in the direction depicted by the arrow 116 in FIG. 2) and toward appropriate collection structures (such as the gutters 106 depicted in FIG. 1 below the lateral edges 114 of the louvers 102).

As previously noted, in some cases, one or more of the louvers 102 may include both a first wing 156 on a first leg 136 and a second wing 154 on a second leg 146. Such an arrangement may increase a number of orientations in which a louver 102 may be installed to allow proper functioning within an assembly. For example, in FIG. 4, assuming that the first wing 156B were present on the first leg 136B of the second louver 102B, the assembly would function the same way if the second louver 102B were instead rotated 180 degrees within the page during installation. Such a modification would effectively flip the second louver 102B such that the first wing 156B (rather than the second wing 154B) on the second louver 102B would abut the first surface 128A on the first louver 102A in the closed condition. However, flipping the second louver 102B by rotating 180 degrees out of the page (e.g., either left-to-right or top-to-bottom) would result in a misaligned arrangement (e.g., in which the first wing 156B on the second louver 102B would not align to engage the first surface 128A on the first louver 102A). In some cases, additional legs and/or wings may be provided (e.g., mirrored on opposite sides of the second louver 102B) to allow features to align in more orientations (e.g., regardless of whether the second louver 102B were flipped in the page, left-to-right out of the page, or top-to-bottom out of the page). In other cases, omitting the first wing 156B (or otherwise not providing additional legs and/or wings) may reduce material costs to produce the louvers 102 and/or provide a single orientation that reduces a risk of operator confusion during installation.

Figure 5:
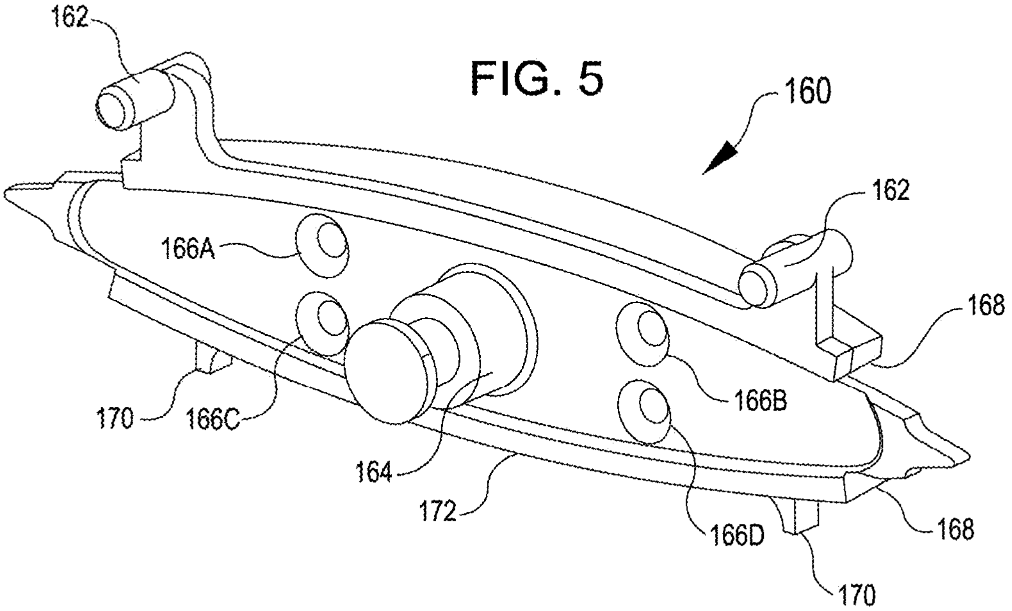
FIG. 5 is a perspective view of an end cap that can be used, for example, with the roof system of FIGS. 1 and 2.

FIG. 5 depicts an example of an end cap 160 that can be used with louvers 102 described herein. The end cap 160 can provide additional structural support and/or sealing for the interior of the louvers 102.

If desired, the end cap 160 may include features for facilitating rotation of a louver 102. For example, the end cap 160 is shown in FIG. 5 with one or more pin projections 162, such as for attaching to openings in the pivot rod 108 of FIG. 1 or other structure operable to control the pitch of the louvers 102 during operation. In some cases, the pin projections 162 can include notches or other appropriate structure to roll into place into the pivot rod 108 and lock so as to prevent inadvertent detachment from the pivot rod 108. In some cases, the end cap 160 includes a pivot shaft 164, for example, which may interface with the frame 104 shown in FIG. 1 to permit the louver 102 to pivot about an axis defined by the pivot shaft 164.

The end cap 160 shown in FIG. 5 also includes features for facilitating attachment to a louver 102. Fastener openings 166 (individually referenced as 166A-166D) can receive fasteners for coupling the end cap 160 with a louver 102. For example, a screw, rivet, pin, or other suitable fastener can be inserted through the fastener openings 166 and received in the fastener mounts 134 identified in FIG. 3. In some cases, the fastener mounts 134 of FIG. 3 may extend along the length of a louver 102 and receive fasteners from either terminus, such as to receive the end cap 160 of FIG. 5 from either lateral edge 114 of a louver 102 of FIG. 1. For example, the fastener openings 166B and 166C of the end cap 160 in FIG. 5 may be respectively aligned with the fastener mounts 134B and 134A in FIG. 3, or alternatively, the end cap 160 may be flipped horizontally out of the page so that the other fastener openings 166A and 166D may respectively align with the opposite terminus of the fastener mounts 134B and 134A in FIG. 3. Additionally or alternatively, lips 168 may extend backward from a front face of the end cap 160 a sufficient amount to engage and/or couple with surfaces of the louver 102, such as along the first surface 128 on the top or first side 124 and/or along the second surface 130 on the bottom or second side 126 of the louver 102 in FIG. 3.

In FIG. 5, the end cap 160 is also shown with stacking bosses 170. The stacking bosses may be sized relative to the pin projections 162, for example, to fit between and/or against the pin projections 162 if one end cap 160 were stacked atop another end cap 160. Such an arrangement may allow louvers 102 coupled with end caps 160 to be stacked with one another (such as for storage or transport to an installation site) in an arrangement having an intervening space in which legs 136 and/or 146 shown in FIG. 3 can extend freely instead of being subjected to forces from the weight of other louvers 102 in the stack.

Figure 6:
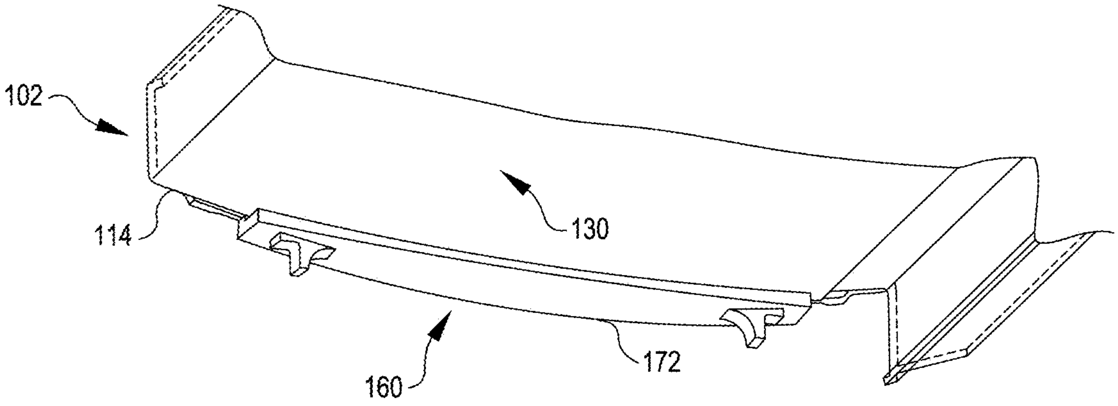
FIG. 6 is a bottom perspective view of the end cap of FIG. 5 coupled with the louver of FIG. 3.

A downward flange 172 is also shown on the end cap 160 in FIG. 5. The function of the downward flange 172 may be appreciated with reference to FIG. 6. FIG. 6 shows a bottom perspective view of the end cap 160 of FIG. 5 coupled with the louver 102 of FIG. 3. When coupled with the louver 102, the downward flange 172 extends generally transverse to (e.g., below) the bottom or second surface 130 of the louver 102. In operation, the downward flange 172 may direct a flow of liquid moving along the lateral edge 114 of the louver 102 (e.g., a flow of rainwater that has traveled in the direction shown by the arrow 116 in FIG. 2 and that is moving from the top or first surface 128 of the louver 102 in FIG. 3 toward the bottom or second surface 130). The downward flange 172 may direct the flow of liquid away from the bottom or second surface 130 and prevent travel of the liquid flow along the bottom or second surface 130. For example, the downward flange 172 may act as a surface or edge from which the liquid will form into droplets or streams. This may cause the liquid to shed from the downward flange 172 instead of curling around the lateral edge 114 (such as by capillary action) or otherwise traveling along the bottom or second surface 130.

Figure 7:
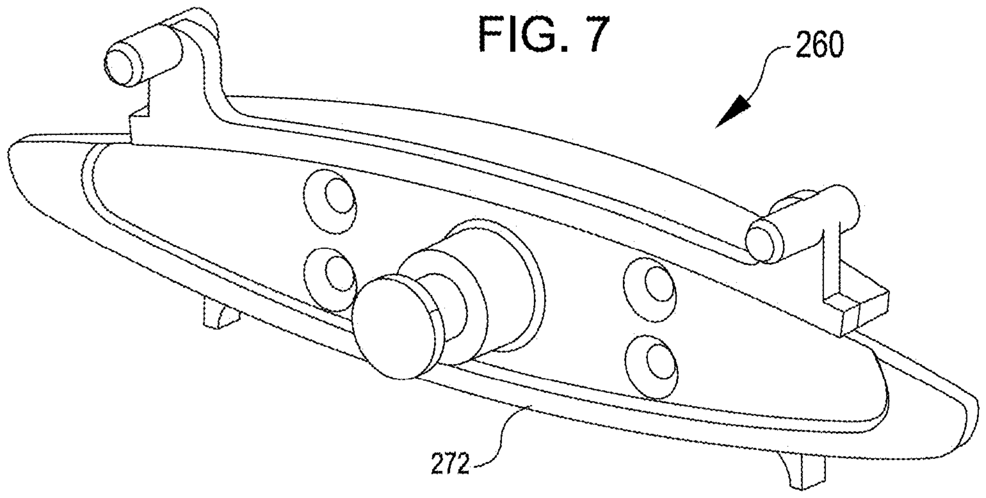
FIG. 7 is a perspective view of another example of an end cap that can be used, for example, with the roof system of FIGS. 1 and 2.
Figure 8:
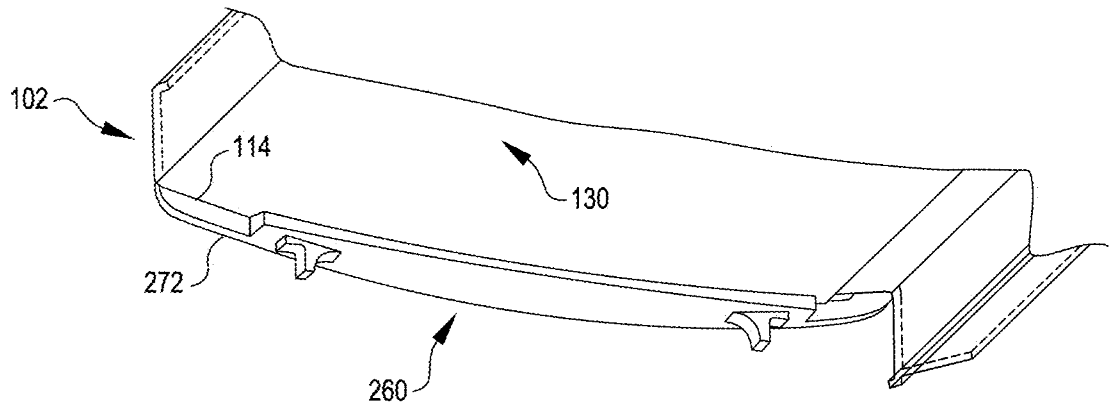
FIG. 8 is a bottom perspective view of the end cap of FIG. 7 coupled with the louver of FIG. 3.

FIGS. 7 and 8 illustrate another example of an end cap 260 that can be used with louvers 102 described herein. The end cap 260 shown in FIGS. 7 and 8 is similar to the end cap 160 shown in FIGS. 5 and 6, but includes a larger downward flange 272 than the downward flange 172 of the end cap 160. Specifically, as may best be seen in FIG. 8, the downward flange 272 extends substantially along an entire span of the lateral edge 114 at which the end cap 260 is coupled. Such an arrangement can reduce a risk of water or other liquid curling around the lateral edge 114 and past the downward flange 172 or 272 along the bottom or second surface 130 of the louver 102.

Additionally, although the downward flange 172 or 272 is shown as part of an end cap 160 or 260, other options are possible. For example, any other feature described above with respect to an end cap 160 or 260 may additionally or alternatively be provided as an integral part of a louver 102 and/or as a distinct part that can be coupled to the louver 102 directly or via intervening components.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A louvered roof system comprising:

a louver of a plurality of louvers, the plurality of louvers configured for movement between an open position and a closed position, each louver in the plurality of louvers comprising:

i. a first end;

ii. a second end opposite the first end;

iii. a top surface positioned on a top side of the louver and between outer edges of the louver;

iv. a bottom surface positioned between the outer edges of the louver and on a bottom side of the louver opposite the top side;

v. an end cap positioned at a lateral edge of the louver, the end cap comprising a top lip extending along the top surface and a bottom lip extending along the bottom surface, the end cap further comprising a flange extending generally transverse to the bottom surface and extending past the bottom surface in a direction away from both the top surface and the bottom surface so as to direct liquid flow from the top surface past the bottom surface to form droplets or streams to fall from a lower part of the flange and prevent travel of the liquid flow along the bottom surface, the flange extending from opposite edges of the bottom lip toward the outer edges of the louver, wherein the end cap further comprises a set of stacking bosses extending downwardly to facilitate stacking atop another instance of the end cap; and vi. a leg having a proximal portion and a distal portion, the leg extending generally transverse to the second end and from the proximal portion to the distal portion wherein, in the closed position, a first louver and a second louver of the plurality of louvers are engaged with one another such that the leg of the second louver is received against the first louver.

2. The louvered roof system of claim 1, wherein the louver of the plurality of louvers comprises the second louver and the louvered roof system further comprises the first louver.

3. The louvered roof system of claim 2, further comprising at least one of:

a guide rod coupled with the first louver and the second louver and configured to cause rotation of both the first louver and the second louver in response to movement of the guide rod;

an actuator operable to move at least one of the first louver or the second louver between the open position and the closed position;

a gutter positioned below a lateral edge of at least one of the first louver or the second louver; or a frame in which at least one of the first louver or the second louver is mounted so as to facilitate movement between the open position and the closed position.

4. The louvered roof system of claim 1, wherein the leg is a second leg, the distal portion is a second distal portion, the proximal portion is a second proximal portion, and each louver in the plurality of louvers further comprises:

a first notch positioned at the first end;

a second notch positioned at the second end;

a first leg having a first proximal portion and a first distal portion, the first leg extending generally transverse to the first end and from the first proximal portion to the first distal portion, wherein the first leg is sized such that, in the closed position, the first louver and the second louver of the plurality of louvers are engaged with one another such that the second leg of the second louver is received in the first notch of the first louver and such that the first leg of the first louver is received in the second notch of the second louver.

5. The louvered roof system of claim 4, wherein each louver in the plurality of louvers further comprises:

a wing extending generally transverse to a longitudinal axis of the second leg from the second distal portion of the second leg; wherein the wing is oriented such that, in the closed position, the first louver and the second louver of the plurality of louvers are engaged with one another such that the wing of the second louver abuts the first end of the first louver and obstructs passage of liquid between the first louver and the second louver.

6. The louvered roof system of claim 4, wherein the first leg extends away from the top surface and the second leg extends away from the bottom surface such that, in the closed position, the first louver and the second louver of the plurality of louvers are engaged with one another such that the first leg of the first louver abuts the bottom surface of the second louver and such that the second leg of the second louver abuts the top surface of the first louver.

7. The louvered roof system of claim 1, wherein the flange extends substantially along an entire span of the lateral edge at which the end cap is coupled.

* * * * *